US007746289B2

(12) United States Patent
Gupta

(10) Patent No.: US 7,746,289 B2
(45) Date of Patent: Jun. 29, 2010

(54) POINT-TO-MULTIPOINT ANTENNA STRUCTURE USING MULTIPLE PASSIVE ANTENNAS

(75) Inventor: Tarun K. Gupta, Danville, CA (US)

(73) Assignee: FiberTower Corporation, San Francisco, CA (US)

( * ) Notice: Subject to any disclaimer, the term of this patent is extended or adjusted under 35 U.S.C. 154(b) by 782 days.

(21) Appl. No.: 11/563,001

(22) Filed: Nov. 23, 2006

(65) Prior Publication Data

US 2008/0125177 A1 May 29, 2008

(51) Int. Cl.
*H01Q 21/08* (2006.01)
*H04M 1/00* (2006.01)

(52) U.S. Cl. .................................... 343/853; 455/562.1

(58) Field of Classification Search ................. 343/833, 343/834, 853, 872, 840, 890, 891; 455/562.1, 455/575.7
See application file for complete search history.

(56) References Cited

U.S. PATENT DOCUMENTS 1,918,291 A * 7/1933 Schroter ...................... 455/25
2,140,730 A * 12/1938 Batchelor .................... 455/25
4,878,062 A * 10/1989 Craven et al. ............... 343/872
7,068,235 B2 6/2006 Guidon et al.
7,079,868 B2 7/2006 Guo
7,079,869 B2 7/2006 Aytur et al.

OTHER PUBLICATIONS

Islam, M. M., et al., "Multiple Directional Antennas in Suburban Ad-Hoc Networks," International Conference on Technology: Coding and Computing (ITCC'04), 2004, p. 385, vol. 2.
"NextG Networks—Photos & Diagrams," NextG Networks, 2005, 5 pages, [online] [retrieved on Aug. 9, 2006] Retrieved from the Internet: <URL: http://www.nextgnetworks.net/solutions/photosdiagrams.html>.

* cited by examiner

*Primary Examiner*—Michael C Wimer
(74) *Attorney, Agent, or Firm*—Fenwick & West LLP

(57) ABSTRACT

A fixed-position transmitter node makes wireless links to two or more fixed-position receiver nodes located within a non-omnidirectional composite coverage volume. The antenna structure for the transmitter node includes an RF power splitter, two or more passive antennas, and an enclosure that houses the antennas. An RF signal is split by the RF power splitter and fed to each of the passive antennas. Each antenna is characterized by its own individual coverage volume, based on that antenna's gain pattern, orientation and RF signal received. The individual coverage volumes of the antennas together in the aggregate define the non-omnidirectional composite coverage volume of the overall antenna structure. In this way, the passive antennas as a group can make the wireless links to the receiver nodes in a directional manner.

41 Claims, 6 Drawing Sheets

POINT-TO-MULTIPOINT ANTENNA STRUCTURE USING MULTIPLE PASSIVE ANTENNAS

BACKGROUND OF THE INVENTION

1. Field of the Invention

This invention relates generally to wireless links and more particularly to an antenna structure for communicating between fixed-position transmitter and/or receiver nodes.

2. Description of the Related Art

Wireless services are conventionally provided between nodes on a network using two traditional types of access configurations. In a conventional point-to-point (PTP) access configuration, a fixed-position transmitter node makes a wireless link to a single fixed-position receiver node. Since the position of the receiver node is generally known a priori and there is only one receiver node, the antenna used in the transmitter node can be a narrow-beam antenna in order to concentrate RF power in the direction of the receiver node.

In a conventional point to multi-point (PMP) access configuration, a fixed-position transmitter node makes a wireless link to several receiver nodes. In a conventional PMP access configuration, the antenna used in the transmitter node may be a broad-beam antenna (i.e., an antenna having a fairly wide antenna gain pattern) so that the RF signal can reach all of the receiver nodes in the desired locations (i.e., within the coverage volume of the antenna). An example of a PMP system is a cellular network, where a single base station communicates with many cell phones simultaneously. Another example is satellite communications where a single satellite communicates to multiple earth stations. In both PTP and PMP configurations, the wireless links can be simplex (i.e., one way) or duplex (i.e., two way).

Network coverage implemented by the PMP approach can have several advantages compared to the same network coverage implemented using solely PTP links. First, PMP links generally require less hardware (and therefore less capital) since a single transmitter node (e.g., a hub node) can broadcast its RF signal to many receiver nodes. In the equivalent PTP system, one transmitter node would be required for each receiver node. Second, PMP systems can be configured to allow operators flexibility to quickly add subscribers onto the network without having to install additional transmitters. For example, if a single hub is transmitting to subscribers within a certain coverage volume, then little if any additional equipment is required at the hub in order to add another subscriber within the coverage volume. In contrast, if solely PTP links were used, additional equipment would have to be installed at the hub in order to set up an additional PTP link between the hub and the new subscriber. Further, PMP solutions generally will reduce the number of antennas at any given location and the space required to house the transmitter node, since a single broad-beam antenna will generally take the place of several narrow-beam antennas. This can significantly reduce the costs (e.g., rent or purchase price) for the associated space and can reduce the costs for installation. Further, by utilizing a single broad-beam antenna instead of several narrow-beam antennas, there is decreased tower loading. Thus, the need for structural upgrades to the towers is decreased. Using fewer antennas and reducing support structures for the towers can improve building and site aesthetics at the location where the transmitter node is installed. This can reduce zoning concerns by minimizing the impact to the skylines.

However, PMP systems generally do not provide the same range as PTP systems for a given level of RF power. As the beamwidth of the transmitting antenna increases (as is generally the case for PMP nodes compared to PTP nodes), the antenna gain decreases as does the range of the transmitter node. This is because PMP nodes generally use antennas with wider beamwidths. Hence, the radiated RF power is distributed over a larger area (or volume), to provide the maximum coverage and is not as concentrated at any one point, as is typically the case with narrow-beam antennas used in a PTP configuration.

If the coverage volume of the PMP node is sparsely populated with receiver nodes, then much of the RF power may be directed to locations where there is no receiver and is therefore wasted. Wasted RF propagation can also be viewed as interference, which reduces spectrum efficiency and capacity. For example, a PMP node may use an omnidirectional antenna (i.e., an antenna with a 360° beamwidth) because the receivers may not be concentrated in any general area. However, there may be an obstruction, such as a building, that obstructs a significant part of the area around the omnidirectional antenna. In this case, the RF power radiated in the direction of the obstruction is wasted since there are no receiver nodes located in that direction.

A similar situation exists for receiver nodes.

Therefore, there is a need for transmitter and/or receiver nodes that overcome some or all of the disadvantages described above.

SUMMARY OF THE INVENTION

The present invention overcomes the limitations of the prior art by providing a fixed-position transmitter node for making wireless links to two or more fixed-position receiver nodes located within a non-omnidirectional composite coverage volume. The transmitter node includes a radio source and an antenna structure. The antenna structure includes an RF power splitter, two or more passive antennas, and an RF transparent enclosure that houses the antennas. The radio source provides an RF signal that is split by the RF power splitter and fed to each of the passive antennas. The antennas are passive in the sense that, for example, they are not elements in a phased array that is actively steered or actively beamshaped. Each antenna is characterized by its own individual coverage volume, based on that antenna's gain pattern, orientation and RF signal received. The individual coverage volumes of the antenna (which could be overlapping) together in the aggregate define the non-omnidirectional composite coverage volume of the overall antenna structure. In this way, the passive antennas as a group can make the wireless links to the receiver nodes. The enclosure can be designed to provide a low profile, aesthetically pleasing package.

The antenna structure can be designed to accommodate different numbers and locations of receiver nodes. For example, if one of the receiver nodes is fairly separated from the other receiver nodes, then one of the antennas may be a narrow-beam antenna in order to make a PTP link from that antenna to the isolated receiver node. Conversely, if some of the receiver nodes form a relatively densely populated sector, then one of the antennas may be a broad-beam directional antenna in order to efficiently make a PMP link from that antenna to the receiver nodes in the sector. An omnidirectional antenna (i.e., a broad-beam nondirectional antenna) may be used to efficiently make links to receiver nodes that are located on all sides of the transmitter node. Different antennas may also be used to make links to receiver nodes located at different elevations, in addition to those located at different azimuths. The individual coverage volume of each antenna within the antenna structure usually will be different (although some could have the same individual coverage volume, for example for redundancy), and the antenna structure uses a combination of antennas with the appropriate individual coverage volumes in order to form the desired composite coverage volume.

In one implementation, the antenna structure contains four antennas arranged in a 2×2 grid. 2×3 grids and 3×3 grids are also desirable antenna arrangements. Example applications include use in the LMDS network, PCS cellular network, paging network, Wi-Fi network, Wi-Max network, or other broadband wireless networks.

Other aspects of the invention include analogous receiver nodes, networks using these transmitter and receiver nodes, the antenna structures themselves, and methods corresponding to any of the foregoing.

BRIEF DESCRIPTION OF THE DRAWINGS

The invention has other advantages and features which will be more readily apparent from the following detailed description of the invention and the appended claims, when taken in conjunction with the accompanying drawings, in which:

The figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE PREFERRED EMBODIMENTS

Figure 1:
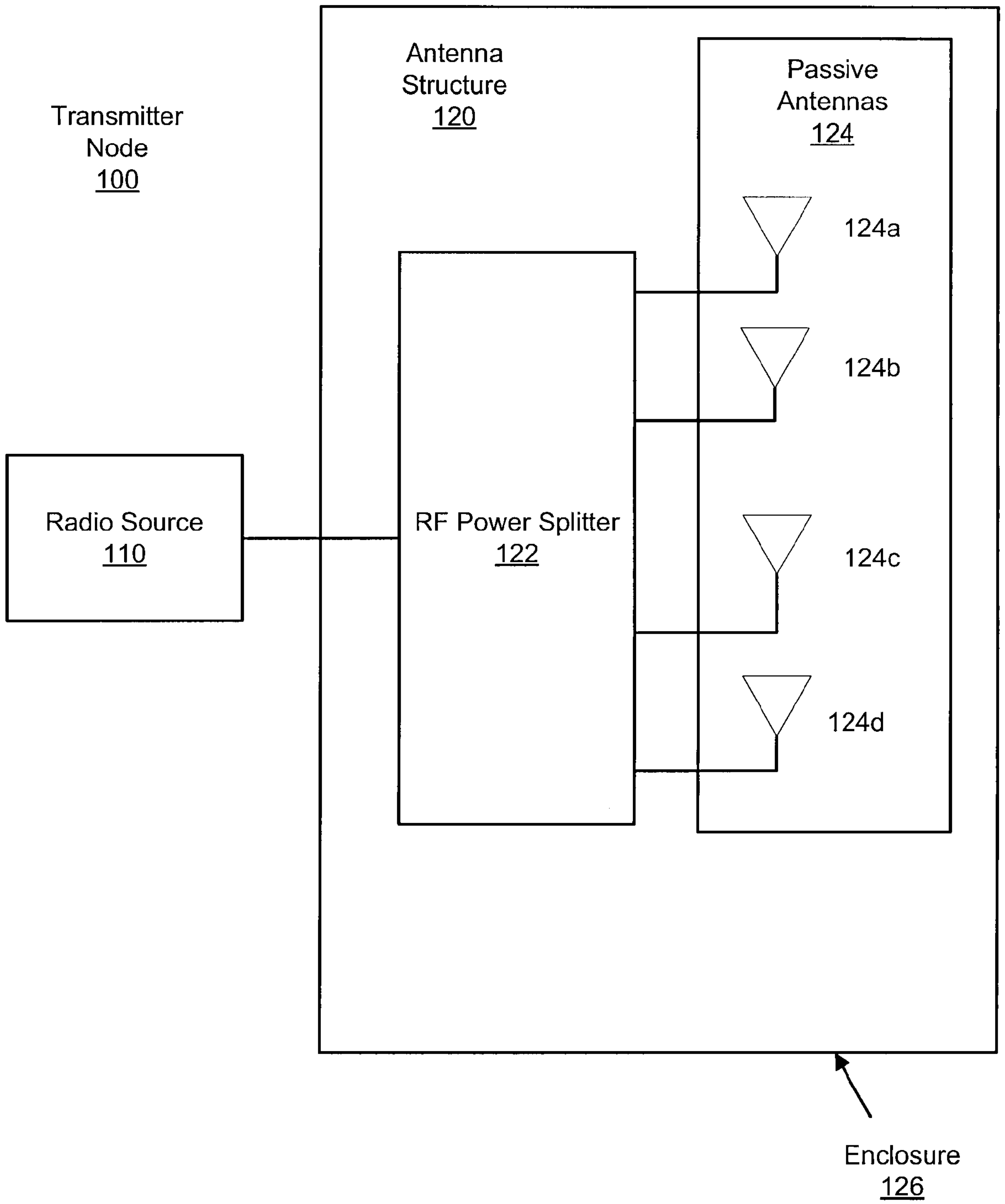
FIG. 1 is a functional diagram of a transmitter node according to the present invention.

FIG. 1 illustrates an example embodiment of a transmitter node 100 according to the present invention. The transmitter node 100 includes a radio source 110 and an antenna structure 120. The antenna structure 120 includes an RF power splitter 122, two or more passive antennas 124, and an RF transparent enclosure 126. The radio source 110 is coupled to the RF power splitter 122, which in turn is coupled to the antennas 124.

The transmitter node 100 operates as follows. The radio source 110 provides an RF signal that is to be transmitted via wireless links to the fixed-position receiver nodes (not shown in FIG. 1). The RF power splitter 122 receives the RF signal from the radio source 110 and splits the RF signal into separate RF signals that are fed to each of the antennas 124. The RF signals exiting the RF power splitter 122 may be of equal power or of different powers. In one embodiment, the RF splitter 122 is a waveguide splitter.

The passive antennas 124*a-d* make wireless links to the receiver nodes. In the example embodiment of FIG. 1, four passive antennas 124*a-d* are shown. In another embodiment, the antenna structure 120 may include a different number of antennas. Each passive antenna may be one of several types of antennas with different antenna gain patterns, including narrow-beam antennas, broad-beam directional antennas, and omnidirectional antennas. Each antenna has its own gain pattern and, given its antenna gain pattern, its position within the antenna structure and the power of the RF signal received, will provide coverage for a certain volume of space relative to the transmitter node. That volume will be referred to as the antenna's individual coverage volume. Each antenna may be individually adjusted to optimize the desired coverage. Also, it is possible that the coverage volumes can overlap. The combination of individual coverage volumes from the multiple antennas 124 compose a composite coverage volume covered by the transmitter node 100. In contrast to conventional systems, the composite coverage volume is non-omnidirectional and thus can be more efficient for transmitting to fixed-position receiver nodes.

The enclosure 126 houses the RF power splitter 122 and the passive antennas 124. It may also include the radio source 110. Parts of the enclosure 126 are composed of an RF transparent material so that it does not block the wireless signal.

In applications such as for the LMDS network or for the PCS cellular network, the transmitter node 100 can be made to appear as a single, stand alone, low profile solution from the outside. For example, in one embodiment, the enclosure 126 is small enough to fit within an 18×18×12 inch rectangular volume. The enclosure 126 may be adapted to be mounted on a flagpole, light pole, or utility pole, for example. Thus, the system provides a small, aesthetically pleasing wireless network node for communicating to multiple receiver nodes in an efficient manner. The system provides several important benefits. For example, the claimed invention benefits cities by alleviating the zoning and structural concerns associated with conventional bulkier systems. The system benefits users, e.g. cell phone subscribers, by expanding coverage without sacrificing aesthetics. Network service providers benefit from increased flexibility, ease of installation, and focused coverage volumes for non-traditionally covered locations.

Figure 2:
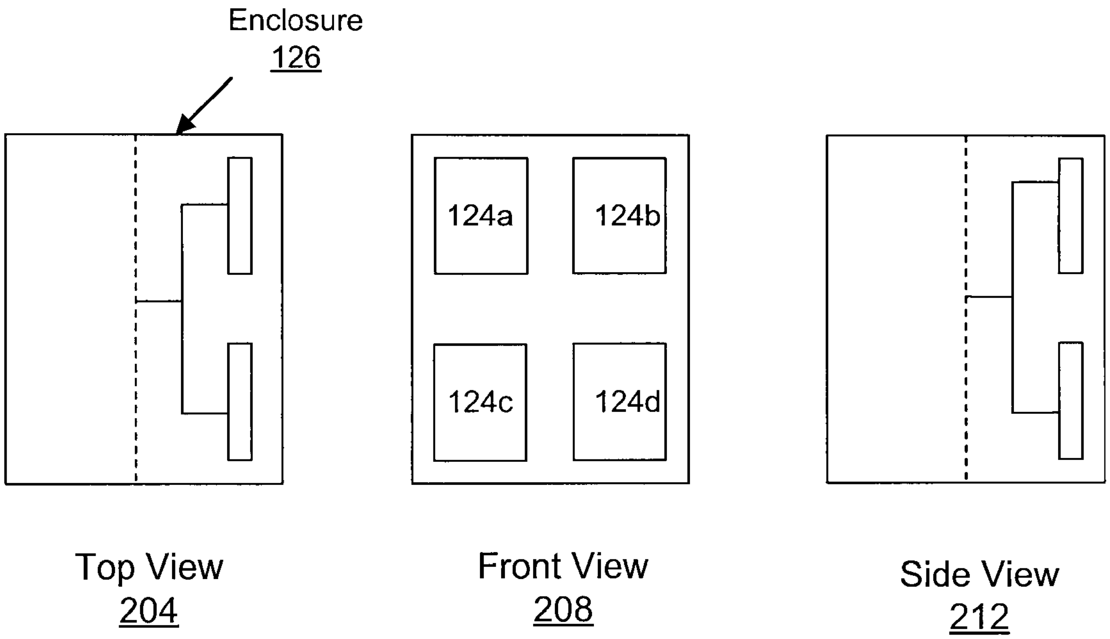
FIG. 2 is one embodiment of the antenna structure shown in FIG. 1.

The passive antennas 124 may be arranged within enclosure 126 in a variety of configurations. FIG. 2 shows a top view 204, front view 208, and side view 212 of one example configuration. In this example embodiment, the antenna structure 120 has four passive antennas 124*a-d* arranged in a 2×2 grid. The orientation of each passive antenna 124 is mechanically adjustable in the azimuth and elevation planes. Antennas can be adjusted by any mechanical adjusting means, such as, for example, turning tuning screws that individually control elevation and azimuth of each antenna. By adjusting antenna orientations, the transmitter node can be adapted to provide coverage to the various receiver nodes.

The transmitter node 100 can be used in different applications and with different RF signals. Example include the PCS cellular network, the LDMS network, paging networks, Multiple Address System networks, Wi-Fi networks, Wi-Max networks, Commercial Mobile Radio Service (CMRS) networks, and other broadband wireless networks. These examples networks cover various frequency ranges between 500 MHz-50 GHz. Thus, various embodiments of the transmitter node 100 may be configured for use with different frequency ranges. The radio source 110 may be located within the enclosure 126 or it may be located external to the enclosure 126. It may even be located remotely from the enclosure 126.

In typical PCS situations, there are many transmitters (for example, 1-30) per downlink carrier. These are generally all combined over a single antenna and transmitted in a single coverage volume. The antennas may be omnidirectional or panel antennas with 45°-90° beamwidths. The power at the output of typical PCS antennas are in the 1000-2000 W ranges. In typical LDMS situations, there are either many PTP antennas, each with outputs of roughly 200 Watts, or PMP antennas, with outputs of 100-150 Watts over the coverage volume.

FIGS. 3-6 are diagrams of networks using transmitter nodes according to the present invention. Generally, the antenna structure 120 will include the combination of passive antennas 124 appropriate to obtain the desired composite coverage volume. Passive antennas include narrow-beam antennas, broad-beam directional antennas and omnidirectional antennas. Narrow-beam antennas are good for making PTP links since they concentrate power within a narrow beam. A typical narrow-beam antenna may have a beam width between 1 to 3 degrees. However, in various embodiments, the beam widths may be different depending on the size of the antenna and the frequency band. Broad-beam directional antennas are good for covering a specific area (sector) that is relatively densely populated with receiver nodes. A typical broad-beam directional antenna may have a beam width between 30 to 90 degrees. An omnidirectional antenna provides a circularly symmetric antenna gain pattern (i.e., a beam width of 360 degrees). Beamwidth is typically measured by the angle off the main beam (0 degrees) to the 3dB point on both sides The 3dB points correspond to points where the power level is half of maximum power (at 0 degrees). Examples of passive antennas 124 include parabolic dish antennas or other antenna structures.

Figure 3:
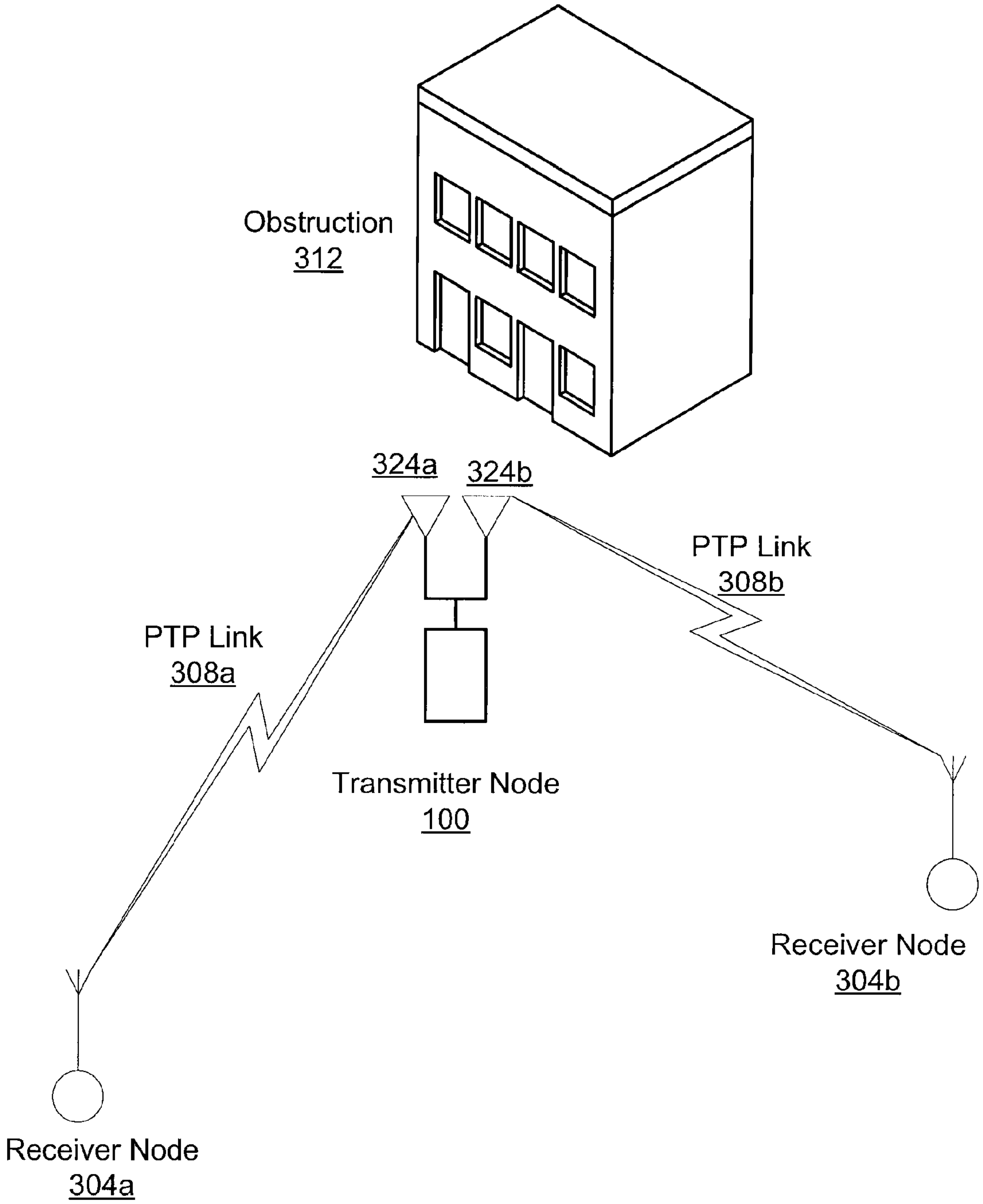
FIGS. 3-6 are diagrams of networks using a transmitter node according to the present invention.

FIG. 3 shows a situation where a transmitter node 100 makes wireless links to two receiver nodes 304*a-b* which are relatively isolated from each other. As a result, the antenna structure for node 100 includes two narrow-beam antennas 324*a-b*, each of which makes a PTP wireless link 308*a-b* to the respective receiver node 304*a-b*. In alternate embodiments, additional narrow-beam antennas 324 may make PTP links to additional receiver nodes 304. The composite coverage volume for the transmitter node 100 is defined by the aggregate of the individual narrow-beam coverages for each of the antennas 324.

Note that many variations are possible. For example, if the two nodes 304 are at the same range, then the two antennas 324 may be the same (i.e., have the same antenna gain pattern) and receive the same RF power, but be oriented in different directions (azimuth and/or elevation). If the two nodes 304 are at different ranges, the two antennas 324 may be fed different amounts of RF power. Alternately, the antennas 324 may be inherently different designs with different antenna gain patterns and maximum gain (although both still narrow-beam). Thus, the system is adaptable to different configurations based on the locations of the receiver nodes 304 in relation to the transmitter node 100. By utilizing PTP links 308 instead of a PMP link, the transmitter node 100 can efficiently communicate to relatively isolated receiver nodes 304 at known locations without wasting transmission power. Note that in this example, the transmitter node 100 also advantageously does not transmit in the direction of obstruction 312 (for example, a building). In addition to efficiency considerations, this is beneficial because it prevents any undesireable reflections from the obstruction which may cause interference. Further, even if no physical obstruction is present, it may be desireable to limit coverage along a border of a licensed area (for example, to meet FCC rules). It may also be advantageous to minimize other undesired coverage.

Figure 4:
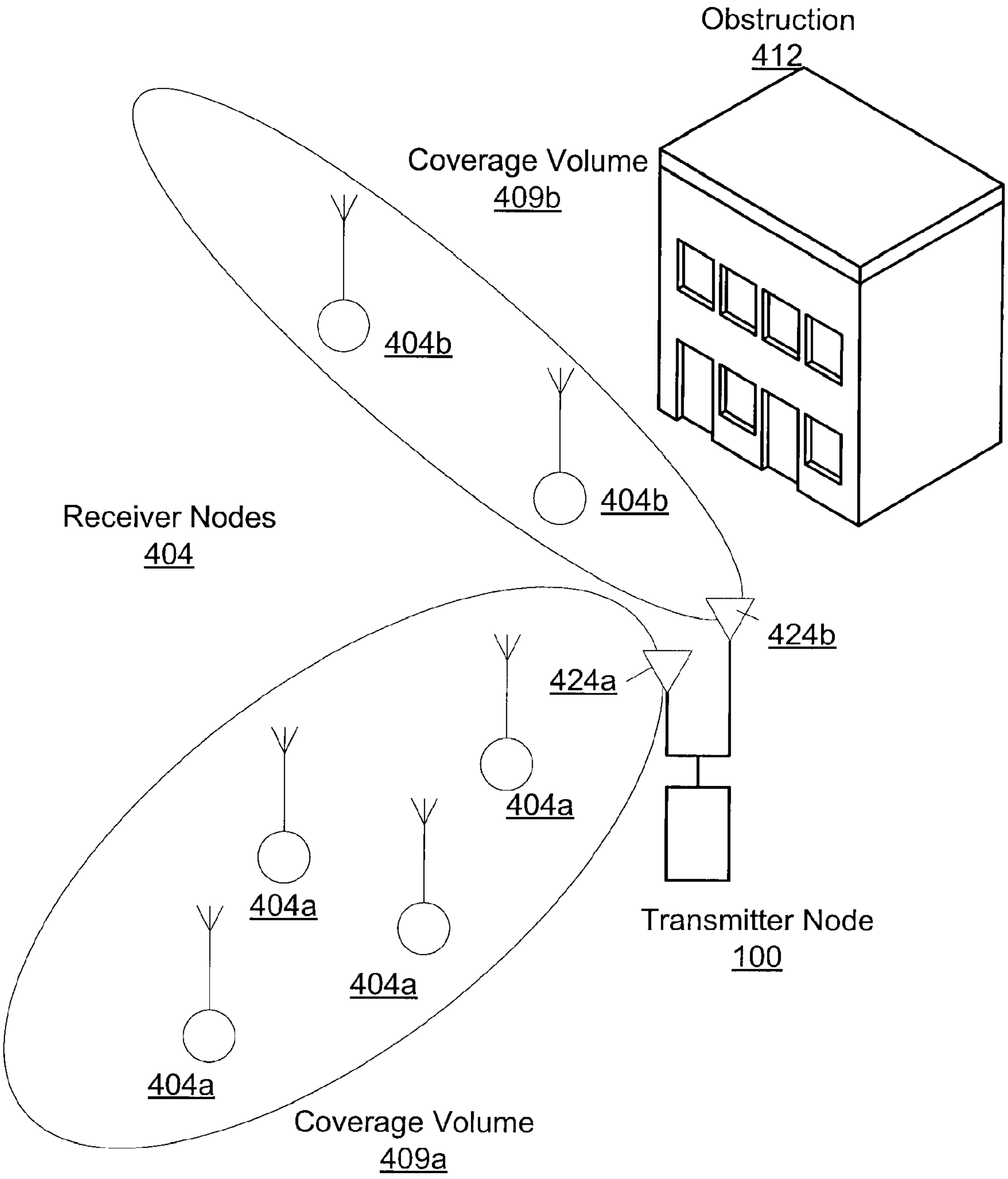

FIG. 4 shows a situation where a transmitter node 100 makes wireless links to many receiver nodes 404, which are located to from two groups 404*a* and 404*b*. The antenna structure for node 100 includes two broad-beam directional antennas 424*a-b*. Each antenna 424*a-b* has an individual coverage volume 409*a-b* and makes a PMP wireless link to the receiver nodes 404*a-b* located in the respective individual coverage volume. The composite coverage volume for the transmitter node 100 is the aggregate of the two individual coverage volumes 409*a-b*. Again, the transmitter node 100 conserves power by directing the RF signal only to where it is needed and avoiding transmission in directions such as obstruction 412.

The example shown in FIG. 4 allows a transmitter node 100 to communicate to many receiver nodes 404 even when there are more receiver nodes 404 than passive antennas 424. In addition, with the use of broad-beam directional antennas, reception of RF signals by receiver nodes 404 may be relatively insensitive to changes in the location of the receiver node 404. Note, however, that the examples of FIGS. 3 and 4 are not meant to imply that narrow-beam antennas are limited to PTP links or that broad-beam antennas are limited to PMP links. For example, in FIG. 3, if there were many receiver nodes located in close proximity to receiver node 304*a*, then narrow-beam antenna 324*a* could make a PMP link to all of them. Similarly, in FIG. 4, if the two receiver nodes 404*b* were situated along the same direction, then a narrow-beam antenna could be used to link to both receiver nodes even if they were widely separated in range. Conversely, a broad-beam directional antenna could be used to service a single receiver node, for example if the location of the receiver node was unknown or changed over time or if additional receiver nodes were expected to be added in the future.

Figure 5:
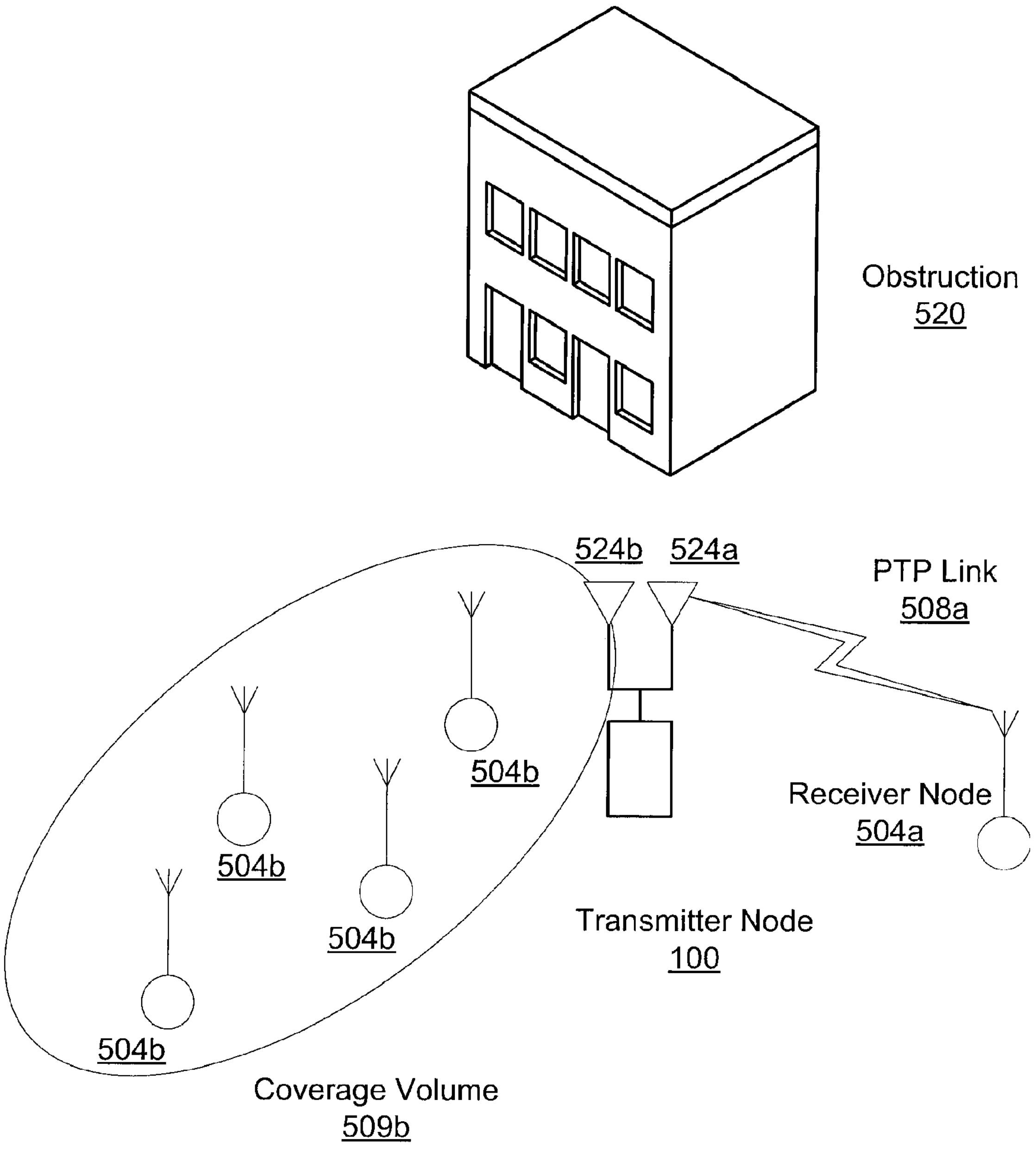

FIG. 5 shows a situation that uses both narrow-beam and broad-beam directional antennas. In this example, there is cluster of receiver nodes 504*b* and a separate, fairly isolated receiver node 504*a*. The antenna structure for transmitter node 100 includes a narrow-beam antenna 524*a* and a broad-beam directional antenna 524*b*. The broad-beam directional antenna 524*b* supplies a broad-beam signal of sufficient width to cover individual coverage volume 509*b*, where receiver nodes 504*b* are located. Thus, a PMP link is made to the receiver nodes 504*b*. The narrow-beam antenna 524*a* supplies a PTP link 508*a* to receiver node 504*a* through a narrow-beam signal. In one embodiment, the receiver node 504*a* is located at a greater distance from the transmitter node 100 than the receiver nodes 504*b*. That is, the narrow-beam antenna 524*a* has a longer range than the broad-beam antenna 524*b* (as would normally be the case if equal RF power were fed to both antennas). The reverse situation can also be accommodated. Additional passive antennas 124 may supply additional wireless links (either PTP or PMP) to cover additional receiver nodes (not shown). Thus, the transmitter node 100 covers a composite coverage volume composed of the combination of narrow-beam and broad-beam individual coverage volumes from the antennas 124.

Figure 6:
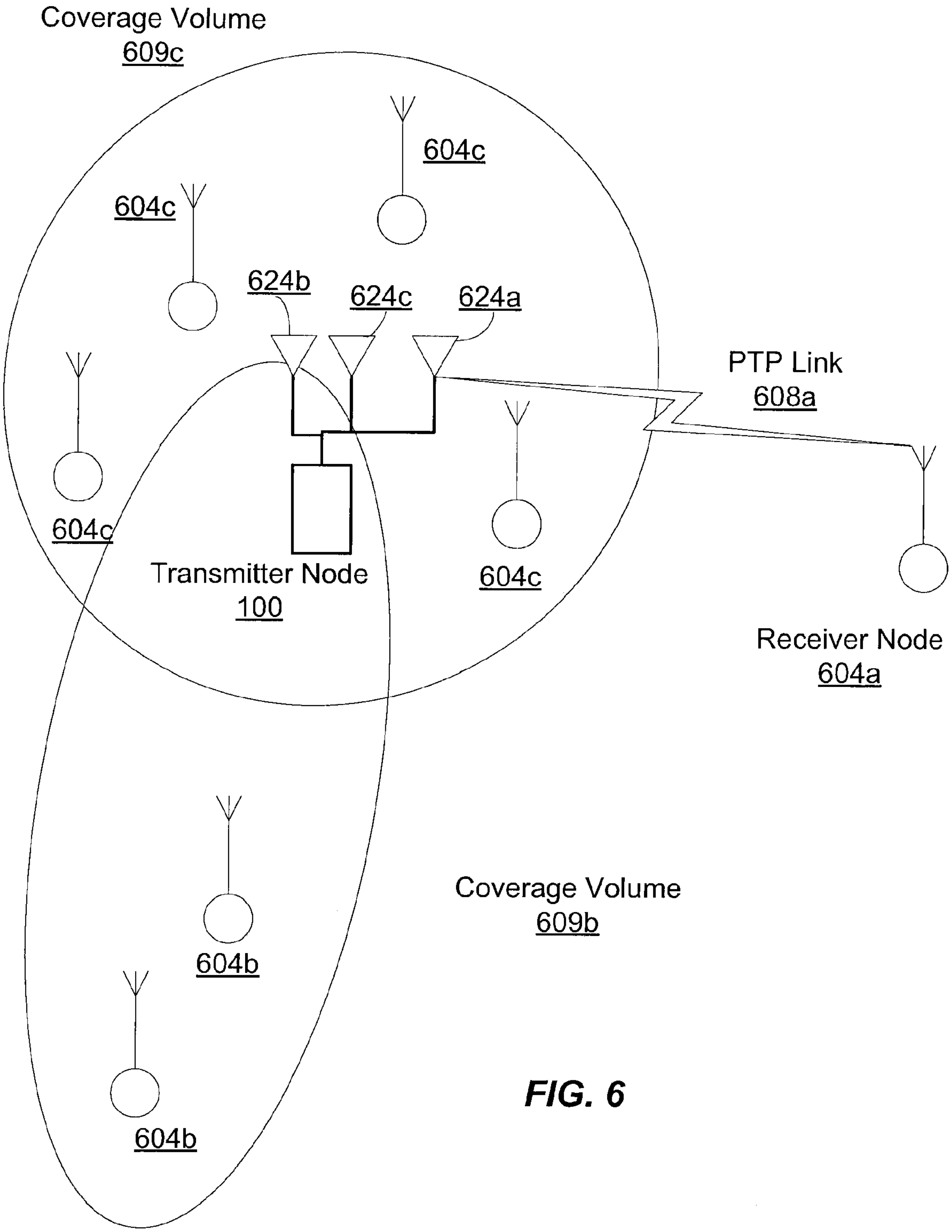

FIG. 6 is similar to FIG. 5 except that the antenna structure further includes an omnidirectional antenna 624*c*. As in FIG. 5, narrow-beam antenna 624*a* makes a wireless link to relatively isolated receiver node 604*a*. Broad-beam directional antenna 624*b* makes a wireless link to a subset of receiver nodes 604*b* located within its individual coverage volume 609*b*. Omnidirectional antenna 624*c* has a 360 degree coverage volume 609*c* and is used to make links to receiver nodes that are close to the transmitter node 100. Note that even though one of the antennas is omnidirectional, the composite coverage volume for the transmitter node is non-omnidirectional due to the asymmetry added by the other two antennas 624*a-b*.

Although the detailed description contains many specifics, these should not be construed as limiting the scope of the invention but merely as illustrating different examples and aspects of the invention. It should be appreciated that the scope of the invention includes other embodiments not discussed in detail above. For example, the principles described above with respect to antenna structures for transmitter nodes can be applied equally to antenna structures for receiver nodes. In addition, the examples above were illustrated with respect to variations in azimuth. Variations in elevation can also be accommodated. Various other modifications, changes and variations which will be apparent to those skilled in the art may be made in the arrangement, operation and details of the method and apparatus of the present invention disclosed herein without departing from the spirit and scope of the invention as defined in the appended claims. Therefore, the scope of the invention should be determined by the appended claims and their legal equivalents.

What is claimed is:

1. A fixed-position transmitter node for making wireless links to two or more fixed-position receiver nodes located within a non-omnidirectional composite coverage volume for the transmitter node, the transmitter node comprising:

a radio source that provides an RF signal to be transmitted to the fixed-position receiver nodes via the wireless links; and an antenna structure comprising:

an RF power splitter coupled to the radio source, for splitting the RF signal into two or more RF signals;

two or more passive narrow-beam antennas coupled to the RF power splitter, the passive narrow-beam antennas making point-to-point wireless links to different fixed-position receiver nodes, wherein each passive narrow-beam antenna is characterized by an individual coverage volume having a narrow beam of approximately 1 to 3 degrees in azimuth directionally oriented toward one of the different fixed-position receiver nodes, and the individual coverage volumes together define the non-omnidirectional composite coverage volume; and an RF transparent enclosure that houses the RF power splitter and the two or more passive narrow-beam antennas.

2. The fixed-position transmitter node of claim 1, wherein the antenna structure further comprises at least one additional passive antenna coupled to the RF power splitter, the at least one additional passive antenna having a different individual coverage volume than the two or more passive narrow-beam antennas.

3. The fixed-position transmitter node of claim 1 wherein each of the two more passive narrow-beam antennas has a same individual coverage volume.

4. The fixed-position transmitter node of claim 1, wherein the passive narrow-beam antennas have individual coverage volumes with a different range.

5. The fixed-position transmitter node of claim 1, wherein the passive narrow-beam antennas have individual coverage volumes with a same range but different orientation.

6. The fixed-position transmitter node of claim 1, wherein the antennas structure further comprises at least two broad-beam antennas coupled to the RF power splitter, the at least two broad-beam antennas each making a point-to-multipoint wireless link to different subsets of the receiver nodes.

7. The fixed-position transmitter node of claim 1, wherein the antenna structure further comprises at least one broad-beam antenna coupled to the RF power splitter, the at least one broad-beam antenna making a point-to-multipoint wireless link to a subset of receiver nodes.

8. The fixed-position transmitter node of claim 7 wherein ranges of the two or more passive narrow-beam antennas are longer than a range of the broad-beam antenna.

9. The fixed-position transmitter node of claim 1 wherein the transmitter node is part of an LMDS network.

10. The fixed-position transmitter node of claim 1 wherein the transmitter node is part of a PCS cellular network.

11. The fixed-position transmitter node of claim 1, wherein an orientation of the two or more passive narrow-beam antennas is mechanically adjustable.

12. The fixed-position transmitter node of claim 11, wherein the orientation is mechanically adjustable in both azimuth and elevation.

13. An antenna structure having a non-omnidirectional composite antenna gain pattern, the antenna structure comprising:

an RF power splitter having an input port to receive an RF signal, the RF power splitter splitting the RF signal into two or more RF signals;

two or more passive narrow-beam antennas all coupled to receive the RF signals from the RF power splitter, wherein each passive narrow-beam antenna is configured to make a point-to-point wireless link to a different fixed-position receiver node, and wherein each passive narrow-beam antenna is characterized by an individual antenna gain pattern having a narrow beam of less than 30 degrees in azimuth directionally oriented toward one of the different fixed-position receiver nodes, and the narrow-beam passive antennas are positioned with respect to each other so that the individual antenna gain patterns together define the non-omindirectional composite antenna gain pattern; and an RF transparent enclosure that houses the RF power splitter and the two or more passive narrow-beam antennas.

14. The antenna structure of claim 13 wherein the two or more passive narrow-beam antennas are positioned so that none of the passive narrow-beam antennas have a same antenna gain pattern oriented in a same direction.

15. The antenna structure of claim 13 wherein the at least two passive narrow-beam antennas are positioned to have a same antenna gain pattern oriented in a same direction.

16. The antenna structure of claim 13, wherein the at least two passive narrow-beam antennas differ in either antenna gain pattern or orientation.

17. The antenna structure of claim 13, wherein the at least two passive narrow-beam antennas have a same antenna gain pattern but are oriented in different azimuthal directions.

18. The antenna structure of claim 13, wherein the at least two passive narrow-beam antennas have a same antenna gain pattern but are oriented in different elevation directions.

19. The antenna structure of claim 13, wherein the at least two passive narrow-beam antennas have a same antenna gain pattern but receive RF signals of different power from the RF power splitter.

20. The antenna structure of claim 13, further comprising at least one broad-beam antenna coupled to receive the RF signal from the RF power splitter.

21. The antenna structure of claim 13, further comprising at least two broad-beam antennas coupled to receive the RF signal from the RF power splitter.

22. The antenna structure of claim 20 wherein the at least one broad-beam antenna has a beam width between 30 to 90 degrees.

23. The antenna structure of claim 13 further comprising at least one omnidirectional antenna coupled to receive the RF signal from the RF power splitter.

24. The antenna structure of claim 13 wherein at least two of the individual antenna gain patterns have different maximum gains.

25. The antenna structure of claim 13 wherein the two or more passive narrow-beam antennas consist of exactly four passive narrow-beam antennas.

26. The antenna structure of claim 25 wherein the four passive narrow-beam antennas are arranged in a 2×2 grid.

27. The antenna structure of claim 13 wherein an orientation of the two more passive narrow-beam antennas is mechanically adjustable.

28. The antenna structure of claim 13 wherein the RF power splitter splits the RF signal into two or more RF signals of equal power.

29. The antenna structure of claim 13 wherein the RF power splitter splits the RF signal into two or more RF signals of different power.

30. The antenna structure of claim 13 wherein the RF power splitter is a waveguide splitter.

31. The antenna structure of claim 13 wherein the enclosure fits within an 18×18×12 inch rectangular volume.

32. The antenna structure of claim 13 wherein the enclosure is configured to be mounted on a flagpole, a light pole and/or a utility pole.

33. The antenna structure of claim 13 wherein the two or more passive narrow-beam antennas include parabolic dish antennas.

34. The antenna structure of claim 13, wherein the narrow beam of the individual antenna gain pattern for each of the two or more passive narrow-beam antennas is 10 degrees or less.

35. The antenna structure of claim 13, wherein the narrow beam of the individual antenna gain pattern for each of the two or more passive narrow-beam antennas is approximately 1 to 3 degrees.

36. The antennas structure of claim 27, wherein the orientation is mechanically adjustable in both azimuth and elevation.

37. A method for making wireless links to two or more fixed-position receiver nodes located within a non-omnidirectional composite coverage volume for a transmitter node, the method comprising:

receiving an RF signal to be transmitted to the fixed-position receiver nodes via the wireless links;

splitting the RF signal into two or more RF signals;

feeding the RF signals to two or more passive narrow-beam antennas housed within an enclosure, wherein each passive narrow-beam antenna is configured to make a point-to-point wireless link with different ones of the fixed-position receiver nodes, and wherein each passive narrow-beam antenna is characterized by an individual antenna gain pattern having a narrow beam of less than 30 degrees in azimuth directionally oriented toward one of the different fixed-position receiver nodes, and the narrow-beam passive antennas are positioned with respect to each other so that the individual antenna gain patterns together define the non-omindirectional composite antenna gain pattern.

38. The method of claim 37, wherein the narrow beam of the individual antenna gain pattern for each of the two or more passive narrow-beam antennas is 10 degrees or less.

39. The method of claim 38, wherein the narrow beam of the individual antenna gain pattern for each of the two or more passive narrow-beam antennas is approximately 1 to 3 degrees.

40. The method of claim 38, wherein the orientation of the two or more passive narrow-beam antennas is mechanically adjustable.

41. The method of claim 40, wherein the orientation of the two or more passive narrow-beam antennas is mechanically adjustable in both azimuth and elevation.

* * * * *